United States Patent [19]

Baker

[11] Patent Number: 4,525,580

[45] Date of Patent: Jun. 25, 1985

[54] METHOD FOR REDUCING COLOR OF POLY(TETRAMETHYLENE ETHER) GLYCOL WITH HYPOCHLORITE

[75] Inventor: Melvin C. Baker, Youngstown, N.Y.

[73] Assignee: E. I. Du Pont de Nemours and Company, Wilmington, Del.

[21] Appl. No.: 634,781

[22] Filed: Jul. 26, 1984

[51] Int. Cl.$^3$ .............................................. C08J 3/00
[52] U.S. Cl. ................................. 528/490; 528/425; 528/488; 568/621

[58] Field of Search ...................... 528/490, 488, 425; 568/621

[56] References Cited

U.S. PATENT DOCUMENTS 3,168,569  2/1965  Matell ................................. 568/621

Primary Examiner—Harold D. Anderson

[57] ABSTRACT

The level of yellow color sometimes associated with poly(tetramethylene ether) glycol can be reduced by bringing the poly(tetramethylene ether) glycol into contact with hypochlorite ions.

4 Claims, No Drawings

METHOD FOR REDUCING COLOR OF POLY(TETRAMETHYLENE ETHER) GLYCOL WITH HYPOCHLORITE

DESCRIPTION

Technical Field

This invention relates to a method for reducing the color level of poly(tetramethylene ether)glycol (PTMEG). It is more particularly directed to a method for reducing the color level of PTMEG by bringing it into contact with hypochlorite ions.

BACKGROUND AND SUMMARY OF THE INVENTION

PTMEG is a commodity in the chemical industry, widely used as a raw material in the preparation of polyurethanes.

As it comes from the preparative process, PTMEG frequently has a yellow cast due to the presence of impurities. This yellow cast has in the past been reduced by blending the PTMEG with less-colored polymer or by removing the impurities, either of which makes the product more costly.

I have now found that the color level can be reduced effectively and cheaply by bringing the PTMEG into contact with hypochlorite ions.

DETAILED DESCRIPTION

The hypochlorite ions used in my process can be derived from any hypochlorite salt which will not interfere with subsequent uses of the PTMEG. Illustrative are sodium hypochlorite, potassium hypochlorite, calcium hypochlorite and magnesium hypochlorite. Hypochlorite ions can also be generated by dissolving chlorine in water to give hypochlorous acid. In fact, it is possible to use water which contains hypochlorite ions as a result of chlorination by a municipal water system, provided the concentration of hypochlorite ions is within certain limits, as will be explained. Sodium hypochlorite and hypochlorous acid are preferred for use.

The PTMEG and hypochlorite ions can be brought together in any convenient fashion, but is best done by first dissolving a hypochlorite salt in water (water from a chlorinated water supply can be used directly) and then admixing the resulting solution and the PTMEG to be treated. This can be neatly integrated into the process for preparing PTMEG by using the hypochlorite solution in the washing step in which catalyst and unreacted reactants are flushed from the polymer.

The aqueous solution so used will ordinarily contain up to about 50 ppm of hypochlorite ions*, preferably about 0.5–10 ppm, even more preferably 1–8 ppm. The actual concentration will be dictated by the amount of residual chlorine that can be tolerated in the finished PTMEG and by the degree of color reduction desired, the higher concentrations naturally given greater reduction.

* As determined colorimetrically, with a Hach DR-100 colorimeter sold by the Hach Co. of Loveland, Colo. 80539, using the procedure that the Hach Company recommends for determining free chlorine (0–3.5 mg/L) and extrapolating the results to express the final figure in ppm of hypochlorite ion.

Enough hypochlorite solution is ordinarily used to give a solution/polymer weight ratio of 1.5–4/1.

The mixture is then agitated as a temperature of 70°–95° C. for a time sufficient to obtain the desired color reduction. The polymer and hypochlorite solution are then separated by siphoning or decantation. There may be some advantage, in certain cases, in bringing the polymer and the hypochlorite ions together in several stages.

The PTMEG thus treated can then be processed conventionally to bring it to its final commercial form.

With this method, one can reduce the color level of a PTMEG from as high as APHA 130, or more, to the threshold of detection.

EXAMPLE

Those skilled in this art will be able to practice this invention more easily after referring to the following illustrative example. They will no doubt be able to compose numerous variations on the theme disclosed, such as changing the amounts of ingredients slightly but insignificantly from those shown, adding innocuous substances, or substituting equivalent or nearly equivalent components for those shown. I consider all these variations to be part of my inventive concept.

Two hundred parts (volume) of distilled water containing 8 ppm of NaOCl were added to 398 parts (weight) of PTMEG polymerizate. This mixture was heated to 120° C. to strip off unreacted tetrahydrofuran.

Another 200 parts of water containing 8 ppm of NaOCl were added to the mixture, which was then stirred for five minutes at 70°–80° C. The mixture was then allowed to rest, whereupon it separated into two phases.

The lower aqueous phase was siphoned off and discarded. A third 200 part portion of water containing 8 ppm of NaOCl was then added to the top phase. This mixture was stirred for five minutes at 70°–80° C. and again allowed to separate into two phases. The lower portion was siphoned off and discarded.

5.2 parts (weight) of hydrated lime were then added to the upper portion. The mixture was stirred under nitrogen until well mixed, stripped of water by heating it at 105° C. under vacuum, and then filtered to give a PTMEG product having an APHA Color of 39**.

** Determined with the American Public Health Association's platinum-cobalt scale, using a Klett-Summerson Industrial Photoelectric Colormeter, No. 42 blue filter, 40 mm path length.

The same polymerizate, then treated the same way but using distilled water containing no NaOCl, had an APHA color of 133.

I claim:

1. A method for reducing the color level of a poly(tetramethylene ether)glycol the process comprising bringing the poly(tetramethylene ether)glycol into contact with hyprochlorite ions for a time sufficient to bring the poly(tetramethylene ether)glycol to the desired shade.

2. The method of claim 1 in which the hypochlorite ions are derived from sodium hypochlorite.

3. The method of claim 1 in which the hypochlorite ions are derived from hypochlorous acid.

4. The method of claim 1 in which the poly(tetramethylene ether)glycol is washed with water containing up to 50 ppm of hypochlorite ions.

* * * * *